"""(12) United States Patent
Ayres et al.

(10) Patent No.: US 7,302,465 B2
(45) Date of Patent: Nov. 27, 2007

(54) DISTRIBUTED MULTIMEDIA TRANSFER (75) Inventors: Larry E. Ayres, North Andover, MA (US); Makonnen Melaku, Metuchen, NJ (US); Zhongsu Fu, Wakefield, MA (US); Seshadri Mohan, Basking Ridge, NJ (US); Stephen N. Wiener, Carlisle, MA (US)

(73) Assignee: Comverse, Inc., Wakefield, MA (US)

( * ) Notice: Subject to any disclaimer, the term of this patent is extended or adjusted under 35 U.S.C. 154(b) by 556 days.

(21) Appl. No.: 10/057,204

(22) Filed: Oct. 22, 2001

(65) Prior Publication Data

US 2003/0078986 A1    Apr. 24, 2003

(51) Int. Cl.
    G06F 15/16    (2006.01)
(52) U.S. Cl. .................. 709/203; 709/217; 709/230
(58) Field of Classification Search ................ 709/203, 709/217
    See application file for complete search history.

(56) References Cited

U.S. PATENT DOCUMENTS

| | | | | |
|---|---|---|---|---|
| 5,632,681 A | | 5/1997 | Bakoglu et al. .............. 463/44 |
| 5,734,589 A | * | 3/1998 | Kostreski et al. ........... 715/716 |
| 5,734,719 A | * | 3/1998 | Tsevdos et al. ............. 700/234 |
| 5,781,909 A | * | 7/1998 | Logan et al. ................ 707/200 |
| 5,948,040 A | * | 9/1999 | DeLorme et al. .......... 701/201 |
| 5,948,404 A | * | 9/1999 | Taketomo et al. .......... 424/115 |
| 5,949,411 A | * | 9/1999 | Doerr et al. ................ 715/716 |
| 5,979,757 A | | 11/1999 | Tracy et al. ................ 235/383 |
| 6,032,130 A | * | 2/2000 | Alloul et al. ................ 705/27 |
| 6,073,075 A | * | 6/2000 | Kondou et al. ............. 701/203 |
| 6,088,722 A | | 7/2000 | Herz et al. .................. 709/217 |
| 6,205,473 B1 | * | 3/2001 | Thomasson et al. ........ 709/217 |
| 6,209,787 B1 | | 4/2001 | Iida ............................. 235/381 |
| 6,219,696 B1 | | 4/2001 | Wynblatt et al. ........... 709/218 |
| 6,236,971 B1 | | 5/2001 | Stefik et al. .................... 705/1 |
| 6,542,812 B1 | * | 4/2003 | Obradovich et al. ........ 701/207 |
| 6,571,279 B1 | * | 5/2003 | Herz et al. .................. 709/217 |
| 6,654,757 B1 | * | 11/2003 | Stern .......................... 707/101 |
| 2001/0022615 A1 | * | 9/2001 | Fernandez et al. .......... 348/143 |

(Continued)

FOREIGN PATENT DOCUMENTS

WO    WO 00/27830    5/2000

(Continued)

OTHER PUBLICATIONS

The Auto Channel, "Mercedes-Benz Unveils DriveBy InfoFueling Research Car; Drive By InfoFueling Car Shows Future Telematics Concepts"; www.theautochannel.com/content/news/2001/11/12/032324.html?, pp. 1-3.

*Primary Examiner*—William Vaughn
*Assistant Examiner*—Ranodhi Serrao
(74) *Attorney, Agent, or Firm*—Mintz, Levin, Cohn, Ferris, Glovsky and Popeo, P.C.

(57) ABSTRACT

A multimedia distribution kiosk can communicate with a remote user to receive multimedia requests and can communicate with a multimedia content provider to obtain requested multimedia content. The kiosk can cache received multimedia content and provide the content as desired. The kiosk can also be used to upload multimedia content to a server. For example, an occupant of an automobile may access a system of kiosks to determine the nearest kiosk and request download of content prior to arrival at that kiosk.

18 Claims, 6 Drawing Sheets

U.S. PATENT DOCUMENTS

| | | | |
|---|---|---|---|
| 2002/0058499 A1* | 5/2002 | Ortiz | 455/412 |
| 2002/0061741 A1* | 5/2002 | Leung et al. | 455/414 |
| 2002/0065730 A1* | 5/2002 | Nii | 705/26 |
| 2002/0095687 A1* | 7/2002 | Shintani et al. | 725/112 |
| 2003/0191816 A1* | 10/2003 | Landress et al. | 709/219 |

FOREIGN PATENT DOCUMENTS

| | | |
|---|---|---|
| WO | WO 00/27831 | 5/2000 |

\* cited by examiner

DISTRIBUTED MULTIMEDIA TRANSFER

FIELD OF THE INVENTION

The invention relates to multimedia communications and more particularly to telecommunications using distributed devices to transfer multimedia information to and from end user devices.

BACKGROUND OF THE INVENTION

Increasingly, people are able to perform more functions and obtain more data while mobile using electronic data devices such as mobile communication devices. For example, personal digital assistants (PDAs) allow people to check appointments, read and send email, browse the Internet, and make and receive phone calls. Mobile phones let people make and receive calls, and perform other functions such as reading and sending email and browsing the Internet. More and more, vehicles are being equipped with electronic systems such as phones, navigation devices, compact disc (CD) players, video cassette players, and digital video disc (DVD) players.

With the increase in mobile distributed information processing, there is also an increase in the availability of multimedia services for this processing. More stores now sell DVDs and other devices, and more systems are available for processing mobile telephone calls and other mobile communications, e.g., from other wireless devices.

SUMMARY OF THE INVENTION

In general, in an aspect, the invention provides a multimedia distribution kiosk. The kiosk can communicate with a remote user to receive multimedia requests and can communicate with a multimedia content provider to obtain requested multimedia content. The kiosk can cache received multimedia content and provide the content as desired.

Implementations of the invention may include one or more of the following features. The kiosk can communicate with the content provider faster than with the user. The kiosk can communicate with the user through a digital storage device such as a CD/DVD burner or a DAT writer. Communication with the remote user can be wireless, e.g., using a short-range wireless protocol such as Bluetooth (IEEE 802.11), HiperLAN (IEEE 802.11a), U-NII, or WLAN (802.11b). Communication with the kiosk can also be through wireline connections such as the Internet. Suggestions for multimedia content may be provided to the user based on information associated with that user. The user can upload information to a content receiver through the kiosk.

In general, in another aspect, the invention provides a method of processing multimedia data. The method includes providing remote access by a user device associated with a user to a multimedia distribution unit, communicating with the user device and a multimedia server, caching multimedia content downloaded from the server, and providing the downloaded content to the user device.

Implementations of the invention may include one or more of the following features. The distribution unit may be one of many such units, with which one being accessed depending on which one a user selects, where the user is, or where the user will be. Recommendations of data likely to be desired by the user can be provided to the user. The data can be provided to the user wirelessly (e.g., using protocols such as Bluetooth, HiperLAN, U-NII, or WLAN), through a physical connection with the user, or be storing the data on a storage medium such as a CD, DVD, or DAT.

In general, in another aspect, the invention provides a system including a multimedia server, and a distributed network of multimedia kiosks. The kiosks can communicate with the server to obtain multimedia data and can communicate with a remote user device to determine desired data. The server provides the desired data to a selected kiosk in accordance with where the user device is expected to be in the future.

Implementations of the invention may include one or more of the following features. The future location of the user device can be determined according to where the user device is presently, how fast the user device is moving, and in which direction the user device is moving. The path that a road that the user is traveling on may also be used to determine the user device's future location.

Various aspects of the invention may provide one or more of the following advantages. Users of the invention can select an infotainment service, make a selection and pay for the selection electronically, request downloading of the selection to a suitable end device, e.g., in a car. Backend storage for content (music, video, stories, etc.), IP-based backend distribution channels, caching servers to improve quality of service, wireless base stations or access point servers to interface with customer devices, and mechanisms for payment and validation may be provided. Multimedia content can be pre-fetched or downloaded upon request. Recommendations may be made for users regarding content likely to be desired by the users. Multimedia content may be requested before arrival at a device for content dispensing. High-speed data download and upload bandwidths may be used between content providers and distributed content dispensers and lower-bandwidths used between distributed content dispensers and content users. Content users may order content before desired download, or other acquisition of the content, wirelessly or using wireline devices at home or while mobile. A wide range of content providers may be accessible without overburdening users. Multimedia content can be provided in real time, even to mobile content users. Multimedia content can be provided to mobile users quickly even if the users do not have high-bandwidth capability.

New-entrant field-service providers, an existing service provider, an Application Service Provider, or an Independent Service Provider could leverage the invention to increase revenue. For example, by employing the invention in gas stations and exploiting the customers' familiarity with gas stations, service providers can considerably reduce marketing costs. Customers may gain familiarity with new technology quickly leading to speedy technology adoption. Equipment can be co-located at gas pumps. Site preparation and the associated real estate cost may be reduced or eliminated. Zoning costs can be eliminated. Convenient, one-stop infotainment shopping may be provided.

Multimedia content upload may be provided advantageously. A news media reporter can report and upload data using less equipment than currently required. For example, only a video camera with compatibility with the invention may be used.

These and other advantages of the invention, along with the invention itself, will be more fully understood after a review of the following figures, detailed description, and claims.

DETAILED DESCRIPTION OF PREFERRED EMBODIMENTS

The invention provides a network of multimedia distribution kiosks for downloading and uploading multimedia data. The kiosks can receive wireless, or non-wireless media requests from a user. If the user is a subscriber, the request may be guided with selections being suggested based on a user profile, e.g., of the user's history, age, sex, or other demographic, personal, or other information. Which of many kiosks is used for a request may be selected from multiple available kiosks, e.g., depending on the requester's current location, heading, speed, destination, etc. The kiosk obtains the requested media and can provide the requested media in real time or near real time to the customer wirelessly, or in permanent form, e.g., by burning a CD or DVD. Non-permanent forms of the requested media may be lent to the customer, e.g., with the requested media data having a time limit for viewing. Lent media may be transferred, e.g., to a home system from a mobile system, so that a user can finish using the media as long as the lease has not expired. The kiosk can also be used for uploading data such as multimedia data. For example, a news crew can send audio and video data to a kiosk for transfer to a central office such as a broadcast center of a television station. Multimedia content can include, but is not limited to, video movies, video clips, video edutainment, audio music, audio books, audio educational materials, and games.

Figure 1:
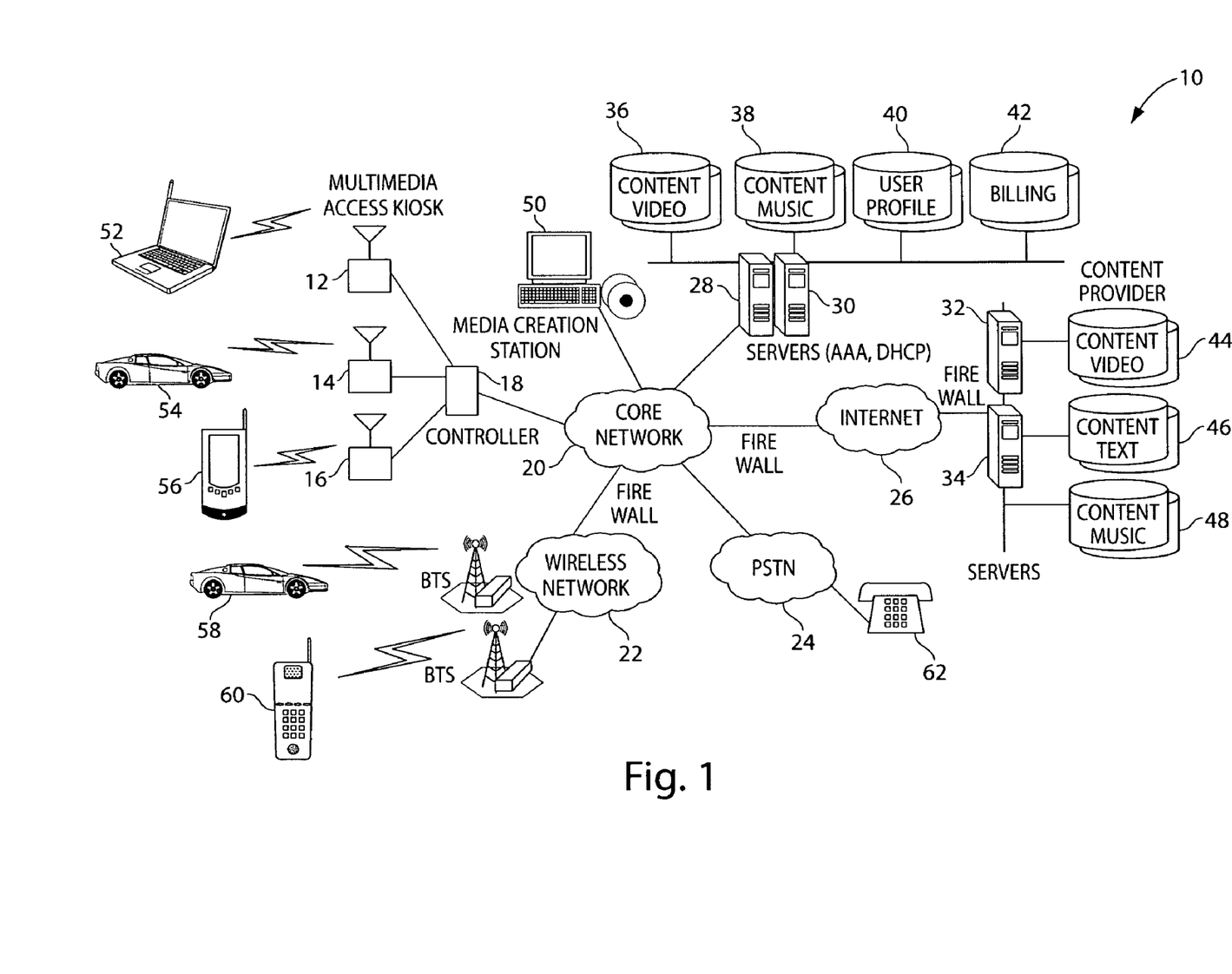
FIG. 1 is a schematic diagram of a telecommunications system employing distributed multimedia distribution kiosks.

Referring to FIG. 1, a telecommunications system 10 includes, here three, Multimedia Distribution Kiosks (MDKs) 12, 14, 16, a controller 18, a core network 20, a wireless network 22, a Public-Switched Telephone Network 24, the global packet-switched network known as the Internet 26, servers 28, 30, 32, 34, storage devices 36, 38, 40, 42, 44, 46, 48, a media production center 50, and various devices 52, 54, 56, 58, 60, 62 configured for or including elements configured for telecommunications. Only three MDKs 12, 14, 16 are shown for illustration, with many, many more MDKs preferable. The devices 52, 54, 56, 58, 60, 62 as shown are a personal organizer 52, cars 54, 58, a personal digital assistant (PDA) 56, a mobile telephone 50, and a wireline phone 62, although other devices are possible. Users of these devices 52, 54, 56, 58, 60, 62 can communicate bi-directionally with the MDKs 12, 14, 16, the PSTN 24, and the wireless network 22, through Base Transceiver Stations (BTSs).

The MDKs 12, 14, 16 are connected through the controller 18 to the core network 20. The connections from the MDKs 12, 14, 16 can be, e.g., Ethernet (100 Mbps or 1 Gbps) connections and the connection from the controller 18 to the network 20 can be, e.g., and Ethernet, T1, or E1 connection. The connection from the MDKs 12, 14, 16 can have a lower bandwidth than the connection from the controller 18 to the network 20. The core network 20 is connected to the Internet IP backbone through a border gateway via a fiber and is also connected to the wireless and wireline networks 22, 24. Several configurations are possible for the network 20, such as a star, token ring, or single network entity node configurations. The core network 20 includes routers and also includes, or is connected to, the servers 28, 30 (that may include AAA servers, DHCP servers, and/or multimedia servers), and the databases 36, 38, 40, 42. An AAA server can perform authentication, authorization, and accounting remotely, that is typical of a 2.5G wireless network, that is connected to the Internet backbone.

The MDK 12 (as with the MDKs 14, 16) can be standalone or connected to a media distribution system through an IP backbone network. If the MDK 12 can have a dynamically-assigned IP address if the MDK 12 belongs to a larger network, or can have its own self-contained IP address if it is standalone. The MDK 12 is based on the IEEE 802.11 Frequency Hopping Spread Spectrum (FHSS) air interface protocol, using, e.g., Bluetooth (IEEE 802.11), IEEE 802.11a, WLAN (IEEE 802.11b), HiperLAN (802.11a), Unlicensed National Information Infrastructure (U-NII), etc. protocols. The MDK 12 can transfer data at a rate from 1-2 Mbps and operates in the unlicensed spectrum of 2.4-2.483 GHz Industrial, Scientific, Medical (ISM) band.

Figure 2:
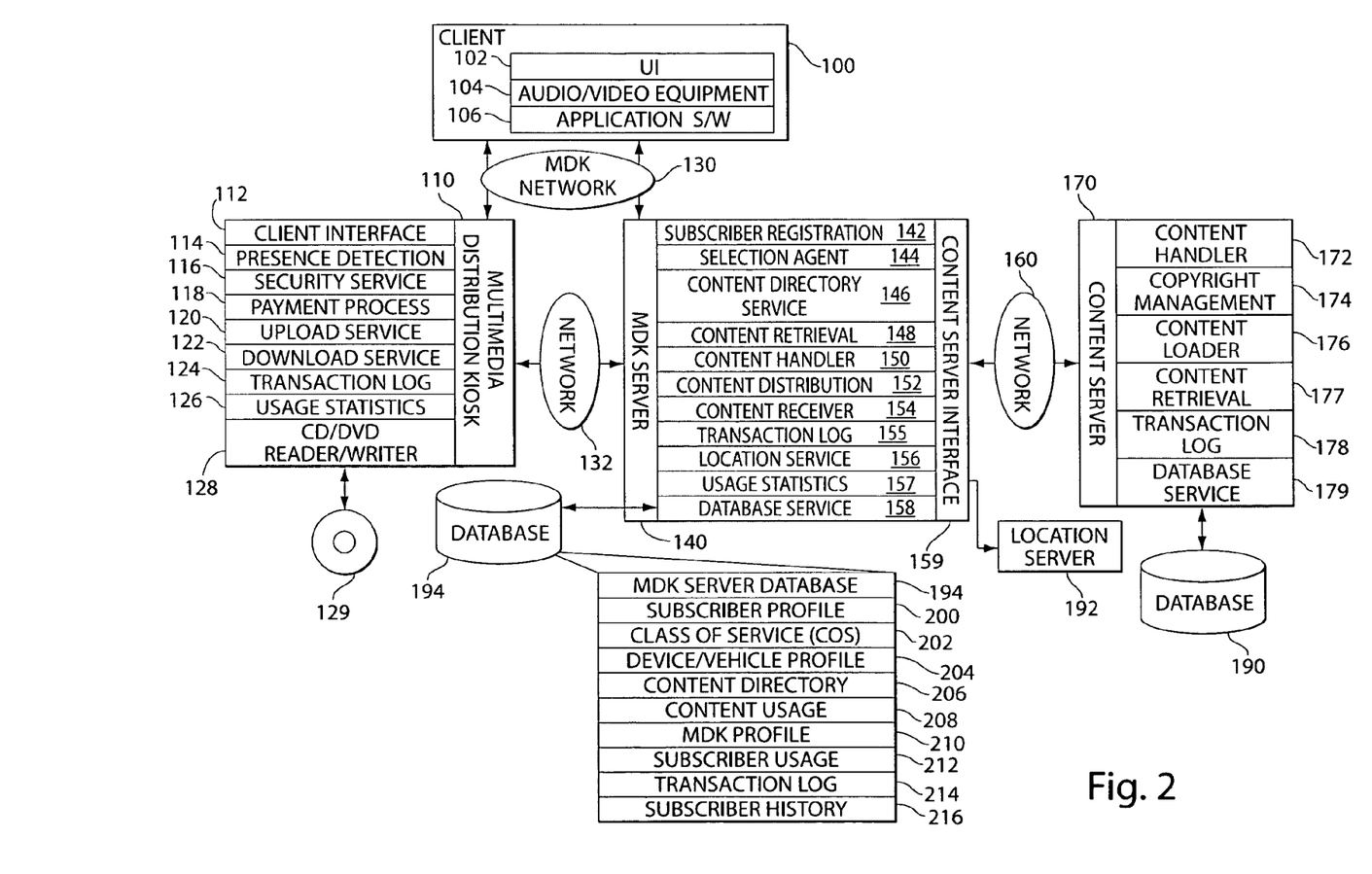
FIG. 2 is a schematic block diagram of hardware and software modules of various components of the system shown in FIG. 1.

Referring to FIG. 2, portions of the system 10 are shown as functional modules. These modules are implemented using hardware and/or software, with software controlling an appropriate processor or processors. As shown, the modules correspond to a client 100, the MDK 110, an MDK network 130 (corresponding to items 12, 14, 16, 18, 22 of FIG. 1), a network 132 (corresponding to network 20 of FIG. 1), an MDK server 140, a network 160 (corresponding to network 26 of FIG. 1), a content server 170, a database 190, a location server 192, and an MDK server database 194.

The client 100 can be, e.g., any of the devices 52, 54, 56, 58, 60, 62 configured for use by a user to interact with other portions of the system 10 (FIG. 1), and includes a User Interface (UI) 102, audio/video (A/V) equipment 104, and application software (s/w) 106. The UI 102 allows a user to select payment methods and conduct payment transaction and to select content such as audio, movie, games and audio/video clip for downloading. The UI 102 can be implementation in numerous ways, e.g., using a wireless web connection to visit a Universal Resource Locator (URL) with JAVA® server page or active server page that implement presentation logic for the user to interact with the system 10. The user can visit a URL such as: http://hostname:8080/mdkserver.jsp to get such service in a web browser. Other implementations can use speech recognition such that the user can speak to the UI 102, that recognizes and parses the user input to produce a selection request to the MDK server 140. For example, the user can say "I am Anne" and "Please select a movie for me" to a voice user interface (VUI). In response, the VUI can issue a request to select a movie for Anne. The request can also be a Hyper Text Transfer Protocol (HTTP) request to a server application or implemented as any other protocols such as remote method invocation, Common Object Request Broker Architecture (CORBA), or Distributed Component Object Model (DCOM).

The A/V equipment 104 provides audio, video and gaming capabilities, and wireless communication. The equipment 104 can be provided, e.g., by auto electronics such as DephiAuto (part of General Motors, of Detroit, Mich.) audio and multimedia systems.

The application software 106 resides in a client computer such as a vehicle computer and provides media control capabilities such as play, stop, pause, rewind, and forward. The software 106 can be, e.g., a media player, a real player, or an MPEG player.

The MDK 110 is configured as the primary interface between the user and the system 10 (FIG. 1). The MDK 110 provides client interface, data upload, data download, and data recording capabilities. Includes in the MDK 110 are the following modules: client interface 112, presence detection 114, security service 116, payment process 118, upload service 120, download service 122, transaction log 124, usage statistics 126, and compact disc/digital video disc (DVD) reader/writer 128. The security service 116 authenticates customers and performs access control.

The client interface module 112 is an interface for communication between the MDK 110 and the client to allow different modes of operation such as web client, or standalone client. The interface 112 is configured to process data from the client 100, and to provide data to the client 100, wirelessly according to a wireless protocol (short or long range), or according to an IP protocol through the MDK network 130.

The presence detection module 114 is configured to detect the presence of a user with prior-requested multimedia content and prior-selected MDK of the MDK 110. In response to detecting the user's presence at the MDK 110, the presence detection module 114 invokes a payment process. This can be implemented with a Bluetooth connection synchronization profile associated with a particular user that has subscribed for MDK service (i.e., a subscriber). For ad-hoc mobile users (i.e., not subscribers) a simple dialogue between the MDK 110 and the client 100, such as a vehicle, can be used to start the service offering. The presence detection module 114 determines if the user is in the short-range wireless coverage of the MDK 110. There are many ways to detect the presence in such sense, such as using a Bluetooth connection. The MDK 110 acts as a master that sends out an inquiry and the client 100 responds with a device ID. The MDK 110 is configured to match the device ID with the content previously selected, or to relay content selected ad hoc, to download the content to the client 100. The MDK 110 will cause a payment menu to be displayed and the consumer can pay for the content via the payment process module 118.

The payment process module 118 pushes a payment user interface to the client 100. This module 118 can start a web page with payment method selection information for the user to select, or download and start a thin client application (with a small footprint for user interface functions) displaying the payment method information for the user to select. In response to user selection, the payment process module 118 will display a confirmation screen for the user to confirm payment information and to transfer payment via the wire or wireless multimedia system.

The upload service module 120 stores content loaded from a user and uploads the content to a targeted content server, e.g., server 170, or to some other system, such as a TV station back office system. The upload service 120 listens to upload requests and passes the requests to an encoder software component to store an incoming stream into local storage. The stored content is uploaded to the MDK server 140 via the network 132. The MDK 110 allows subscribers such as a news reporter, an independent reporter, an author, a tourist sending a video to a family, or a student, to upload multimedia content to a remote server via a short distance wireless communication connection such as HiperLAN (802.11a) or a wire communication connection such as a fiber optical communication channel. The uploading allows broadband delivery for wire or wireless users.

The download service module 122 stores content received from the MDK server 110 via the network 132. Downloaded content is stored in cache memory for quick access and deliver to the client 100. The download service module accesses and sends requested cached content to the client 100.

The transaction log module 124 tracks and records activity of the MDK 110 in a transaction log file. Relevant actions performed by the MDK 110, and indicia of requests or other data received by the MDK 110 are noted and records of such activity and data are stored by the transaction log module 124. The stored data may be used, e.g., for reference, including analysis to determine consumer behavior, trends, and to provide assistance to users through recommendations of available content.

The usage statistics module 126 renames the transaction log file and creates another one for the transaction log to write. Existing transaction logs can be accessed without interrupting the transaction log module 124 to write transaction details to the log file. This section of process is mutually exclusive to the transaction log module processing. The usage statistics module 126 analyzes the transaction log to extract and organize usage information for each content title. Usage statistics can be sent to the MDK server 140 at a predetermined interval, e.g., daily.

The CD/DVD reader/writer 128 is configured to read and bum CDs and DVDs 129. CDs and DVDs 129 can be read, e.g., to upload information and CDs and DVDs 129 can be written, e.g., to provide downloaded content to the client 100 in physical, tangible form.

The MDK server 140 provides an interface between the client 100 and the content server 170, and between the client 100 and the MDK 110. The MDK server 140 may be implemented using, e.g., a UNIX® or Solaris® system. The MDK server 140 can communicate with the client 100 through the network 130 while bypassing the MDK 110, e.g., if the client 100 establishes contact with the MDK server 140 through the PSTN 24 (FIG. 1) or through the wireless network 22 (FIG. 1). Content uploaded from the client 100 or downloaded from the content server 170 is processed by the MDK server 140 for delivery to the content server 170, and client 100, respectively. The MDK server 140 includes the following modules: subscriber registration 142, selection agent 144, content directory service 146, content retrieval 148, content handler 150, content distribution 152, content receiver 154, transaction log 155, location service 156, usage statistics 157, database service 158, and content server interface 159.

The subscriber registration module 142 allows a subscriber to register for different services and stores registration information into the database 194 via the database service module 158. The registration information contains subscriber information, and subscriber profile such as class of services (COS), preferred payment method, preferred music or movie category, subscriber's family members' ages, services requested, and routing address (URL for example) for data upload.

The selection agent module 144 starts a conversation for a subscriber or an ad-hoc user and makes some decisions for content selection on behalf of the user. These two situations are handled differently by the module 144. For a subscriber, the selection agent module 144 works in the background proactively for subscribers to prepare next selections. Such selections could be, for example, a new release by favored artist, a next book or chapter in a series by a favored author, or a narration from an audio book for the subscriber's family. The selection agent module 144 records selection results in the subscriber's profile. When a subscriber initiates a conversation, e.g., by a URL or by a client application, to the MDK server 140, the selection agent 144 will check the subscriber's profile and provide recorded results to the user.

The selection agent module 144 implements an algorithm to select an MDK. The selection agent 144 proactively narrows down choices presented to the user by analyzing and mining the user's profile, searching the content for new releases, and selecting recommendations based on history information stored in a user profile. The criteria for selection could use information available in the profile such as user's past selections, statistics available as applicable to the user's age group, and content's popularity, and usage history. MDK selection is based on the current user's location. The multimedia kiosk selection is a location-based selection that combines the MDK location and pricing information at different MDKs since MDKs may differ in their price structure.

The selection agent 144 has several components: worker, responder, searcher, and filter. The worker proactively works in the background to prepare the best selection for the user. The responder responds to the subscriber's request and retrieves the results prepared by the worker. The searcher calls the content retrieval module 148 to get the location of requested content. The filter narrows down an available-content results set from the content server 170, if needed.

Each subscriber can have a worker to prepare for the next selection by the subscriber. The MDK server 140 controls the worker resources and a number of agents can run simultaneously. The worker accesses the subscriber's profile and usage, e.g., for interests, usage patterns, and age of the subscriber's family members or other persons that typically may accompany the subscriber. The worker prepares separate lists for each person registered in the family, or otherwise with the subscriber, with, e.g., category information (cartoon, movie series, Disney, etc), age information, and interests information.

For each person associated with the subscriber (e.g., member of family) the worker and searcher may operate to retrieve prospective content, or indicia thereof. The worker gets the member's (i.e., a member is of a subscriber group) profile. The worker analyzes the individual preferences (interests), and matches keywords with an alias vocabulary (e.g., synonyms such as "violin" for "string instrument") in a content category description that helps improve match hit rates. Matched results can be used for analysis. The searcher uses the matched results to call the content retrieval module 148 to obtain, from the content server 170, matched content titles and their locations. For instance, if the member likes Disney movies, the category can be "new Disney movie release" and a movie name list can contain "Spy Kids" for a potential selection.

The matched content titles can be filtered by the selection agent module 144. The module 144 can use, e.g., price, content release date, and subscriber history information to narrow the potential selections down to a manageable size, e.g., 5 titles, and store these selected titles as a prepared selection list for each member.

When a subscriber requests a service from the server 140, responder software passes the request to other components to process the request and returns results of the request to the user. The responder gets the member ID and the selection results are pushed to the user for final selection of the content. The MDK server 140 can identify the subscriber by the subscriber's electronic identification number and can map this ID number into a temporary IP address so that the subscriber can download or upload content of choice.

For ad-hoc users, the MDK server 140 provides content to the user if the content is not cached by the MDK 110. For ad-hoc users, the MDK 110 provides a list of selections cached in the MDK 110 and an option for the user to select other content. If the user selects content from the cached list, then the selected content can be downloaded immediately. Otherwise a selection for other content will cause the MDK 110 to communicate with the MDK server 140 to obtain other options and to obtain the content selected, if any, from the farther options provided.

The content directory service 146 organizes content directory information to allow for addition, deletion, and modification of entries. The content directory information describes what content is available for retrieval.

The content retrieval module 148 accepts input from a user or the content selection agent 144 and retrieves the selection according to the user input from the content server 170. The retrieval module 148 communicates with the content server 170 through the content server interface 159.

The content handler/adaptor module 150 converts content to a preferred format for a specific client device, such as a vehicle, to playback. For instance, if a car contains an MP3 player, the module 150 will convert a piece of music to MP3 format if the content is supplied in a different format.

The content distribution module 152 checks an MDK profile to determine if the content selected by a user needs to be pre-fetched. If the selected content was already stored in the targeted MDK 110, then no pre-fetching is required. Otherwise, the content distribution module 152 sends retrieved content to the targeted MDK 110 as pre-fetched content for the user and records the details of the pre-fetching in the MDK profile.

The content receiver module 154 receives content to be uploaded from the MDK 110 and uploads the content to the designated content server 170. The receiver 154 looks at an address of the content server 170 supplied with the content to be uploaded and writes the content to the designated content server 170.

The transaction log module 155 tracks and records activity of the MDK server 140 in a transaction log file. Relevant actions performed by the MDK server 140, and indicia of requests or other data received by the MDK server 140 are noted and records of such activity and data are stored in the transaction log. The stored data may be used, e.g., for reference, including analysis to improve MDK server 140 efficiency.

The location service module 156 requests, for mobile users, the location server 192 for the location of the user, e.g., a registered vehicle, and looks for the user's preference for an MDK 110 given the user's preferred content and the prices for this content in desirable MDKs 110 given the user's present or future location. The user may select which MDK 110 to use if there are multiple possibilities. A list of multimedia distribution kiosks are selected by the location service module 156 as follows. A responder sends a request to the location service 156, that requests a user's location from the server 192. The server 192 can determine a user's location using, e.g., cell phone triangulation, or Global Positioning System operation, or other techniques, as appropriate. The location service 156 translates the location information from the server 192 into an area. Using the determined area, the service 156 determines all the MDKs listed in the area determined area, and sends the names of the MDKs to the responder. The server 192 and/or the service 156 may use information regarding the user's future location, e.g., speed, time to desired stop, to determine the area and/or list of MDKs to provide to the user.

The usage statistics module 157 accepts usage statistics from different MDKs 110 and aggregates them to send to the copyright management in the content server 170. This module 157 may thus be used to track royalties to be paid, as well as to help determine popularity of content that may help determine what content to provide and/or at what price or other attributes (e.g., duration of rental).

The database service module 158 is an interface between applications and the database 194. The database service module 158 provides services to access the database 194 to store and/or retrieve information.

The MDK server database 194 stores information regarding subscribers and content. Included in the database 194 are the following modules: subscriber profile 200, class of service (COS) 202, device/vehicle profile 204, content directory 206, content usage 208, MDK profile 210, subscriber usage 212, transaction log 214, and subscriber history 216.

The subscriber profile 200 contains the information to identify a subscriber and help speed a transaction involving the subscriber. The profile 200 includes a subscriber ID, the subscriber's name, address, phone number, and number of members associated with the subscriber, e.g., number of family members. Preferences of multimedia for both the subscriber and the associated members are stored. The profile 200 also contains content categories that the subscriber and/or associated members used in the past. For example, indicia of Disney movies, cartoons, and/or new movies may be recorded. Preferred payment method is stored, preferably in association with particular transaction values or ranges of values. The preferred payment method may include, e.g., the subscriber's preferred credit card number.

The class of services (COS) module 202 indicates services for which the subscriber registered. The services can dictate the characteristics, e.g., speed and/or priority, of service provided to the particular subscriber.

The device/vehicle profile 204 contains information regarding the type of user device/vehicle and capabilities of the device/vehicle regarding multimedia data. The profile 204 includes an identification of the device/vehicle and the make and/or model of the device/vehicle. A personal device category is stored as a code to indicate personal device capability. The profile 204 further includes a preferred audio format, that includes a default format preferred for audio, and a preferred video format, that includes a default format preferred for video.

The content directory module 206 contains directory information for use by the content server 170 (and other content servers) to retrieve content, including content title, content author/producer, content category, release date, provider ID, price, and server address. The content title includes the name of the content such as a song's name, or a movie's name. The content author/producer is, e.g., the name of an artist, symphony, or movie producer. Content category indicates, e.g., if the content is a piece of pop music, classical music, kids' cartoon, kids' movie, teenager movie, documentary film, or any other media type. Content price is the cost of the downloaded content. Server address indicates where, e.g., which content server, to search to find the contents the user desires. One category can have many content servers to search, i.e. one content can have many entries in the content directory.

The content usage module 208 has information regarding frequency of use of available content. The module 208 contains indicia of content title (name and/or other identification of the content), content source to indicate which content server the content is from, and content download times to indicate number of times the content has been downloaded, e.g., ever or over a given time period such as a month or year.

The MDK profile module 210 contains information regarding the MDKs 110 with which the MDK server 140 is associated. The profile includes MDK ID, name, capacity, content list, and kiosk location. The MDK capacity indicates the storage capacity of the MDK 110. The content list indicates the contents stored in a given MDK 110 and can be used, e.g., to decide if the content selected by a user needs to be sent to the MDK 110. The kiosk location is an address of that MDK 110 used to display possible MDK selections for the user.

The subscriber usage module 212 stores information about the subscriber and the content. Information stored in this module includes a subscriber ID, a member code that is used to identify characteristics of persons associated with the subscriber, a content ID, and a content code that is used to assist an agent to improve the dialogue between the user and the system.

The transaction log module records transaction data between the MDK server 140 and the MDK 110. Recorded data include an MDK ID of the MDK 110 that requests content, a time stamp with date and time, an ID of content requested to be cached, and status of a content request (e.g., start or complete).

The subscriber history module 216 contains service access history. This history includes a subscriber ID, an identification of the content viewed by the user, a content category, an indication of who used the content, and how long the download of content took.

The content server interface 159 provides a conduit for information between the content server 170 and the MDK server 140. The interface 159 converts data into proper format, as appropriate, for transfer between the servers 140, 170 via the network 160.

The content server 170 interacts with the MDK server 140 through the network 160 and provides storage for, and access to, multimedia content for use by the user and storage for content uploaded. by a user. The content server 170 includes the following modules: content handler 172, copyright management 174, content loader 176, content retrieval 177, transaction log 178, and database service 179. The content handler 172 classifies content based on the multimedia file format and header information. The handler 172 also converts content to different formats as appropriate for storage or download. The copyright management module 174 manages the copyrighted content and records the usage of copyrighted content for royalty purpose. The content loader 176 accepts batch content load requests and stores the content in the database 190. The content retrieval module 177 accepts retrieval requests from the MDK server 140 and allows the MDK server 140 to distribute content to the user. The transaction log module 178 logs content loader and retrieval activities in the database 190 and accepts aggregated/accumulated usage information from the MDK server 140 for right management service. The rights may include copyrights, use rights, and rights rules such as view rights, transfer rights, distribution rights and time to expire. The database service module 179 provides an interface and conduit of information between the database 190 and the modules of the content server 170 for retrieval of information from, and storage of information in, the database 190.

Figure 3:
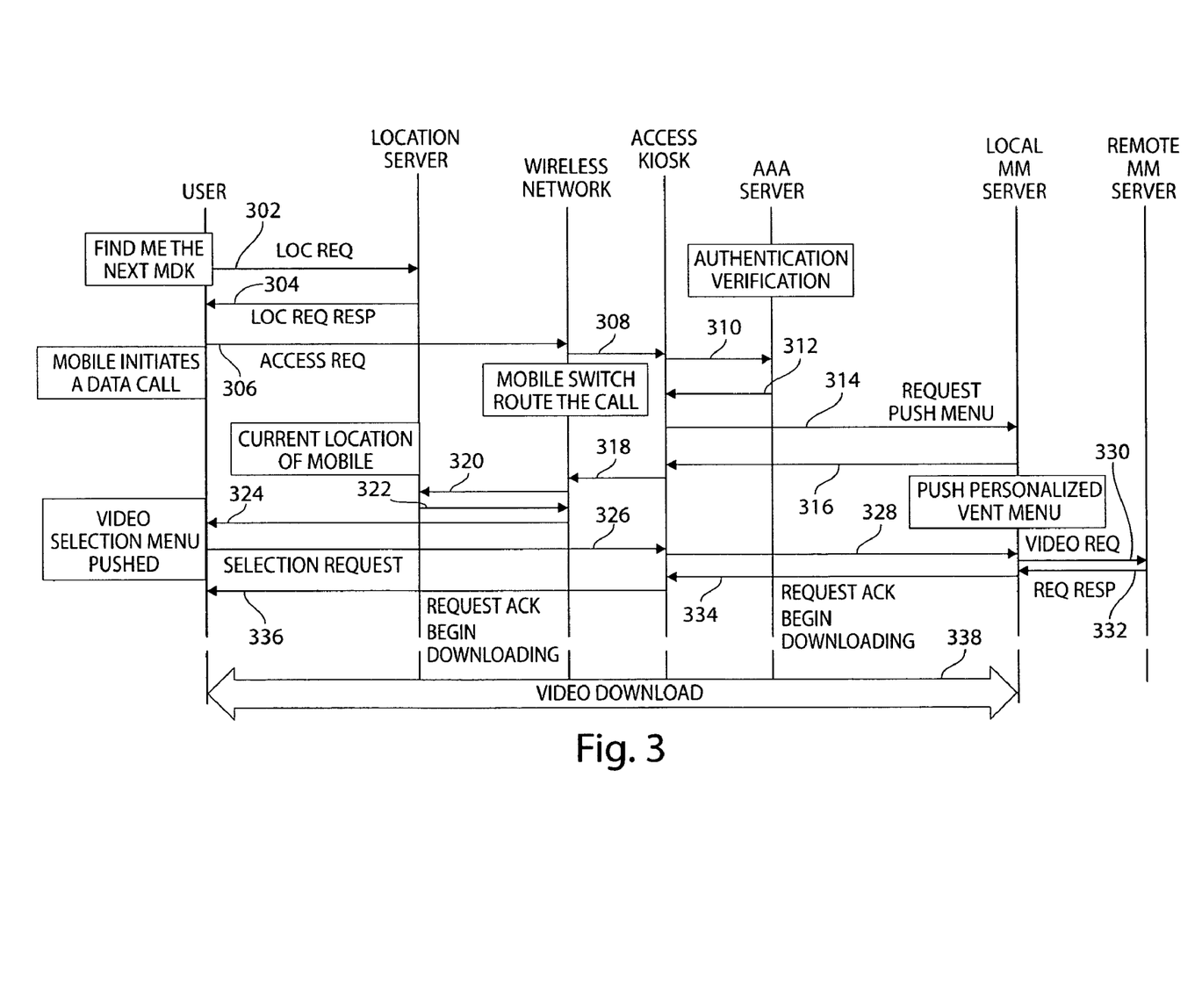
FIG. 3 is a flow diagram of a process of downloading multimedia content to a subscriber using the system shown in FIG. 1.

In operation, referring to FIG. 3, with further reference to FIGS. 1-2, a process 300 for multimedia content, here video, downloading to a subscriber using the system 10 includes the stages shown. The process 300, however, is exemplary only and not limiting. The process 300 can be altered, e.g., by having stages added, removed, or rearranged.

At stage 302, the user requests for location information from the 2.5 G/3G wireless network 22 for the nearest/most appropriate Multimedia Distribution Kiosk 12, 14, 16. For example, a user in a car may wish to access an MDK at a gas station that the user will be at or near in the future. If the user is using the phone 62, then the request is processed through the PSTN 24.

At stage 304, the location server 192 and location service 156 determine the nearest/most appropriate MDK 12, 14, 16. This determination may yield an MDK 12, 14, 16 that is not the nearest, e.g., if a further MDK will be nearer when the user desires to stop. The user is sent an indication of the location of the nearest/best MDK 12, 14, 16.

At stage 306, the user initiates a data call through the wireless infrastructure to get access to the MDK network 20 for downloadable entertainment. A wireless mobile switch routes the data call to the destination.

At stages 308, 310, in response to receiving the data call from the mobile switch, the MDK 12, 14, 16 requests verification of the information provided. The MDK server 28, 30, 140 identifies the user in the MDK database 194.

At stages 312, 314, the server 28, 30, 140 provides acknowledgement of verification to the MDK 12, 14, 16, and the MDK 12, 14, 16 requests the multimedia server 140 to push a menu of possible selections into the user device. This request is for subscribers that can have recommendations made for them based on their profiles.

At stages 316, 318, the MDK menu of possible selections is provided. This menu is transmitted through the MDK 12, 14, 16 to the mobile switch center in the wireless network 22.

At stages 320, 322, the wireless network 22 determines if the mobile subscriber is within the short-distance wireless coverage for downloading. The location server 192 is accessed for location information of the mobile subscriber to determine proximity to the selected MDK 12, 14, 16.

At stage 324, the wireless network 22 pushes the menu to the subscriber. The wireless network 22 sends the menu to the user, whose device 58, 60 displays the menu to prompt the user for likely selections by the user given the user's profile.

At stages 326, 328, the user selects and transmits a request for content to the MDK 12, 14, 16. The subscriber can select from the recommendations provided, that may speed the selection process, or may opt to choose content aside from options recommended as choices the subscriber may be inclined to make. Whatever selection is made, the subscriber's selection is transferred to the MDK 12, 14, 16. If the requested content is already stored (e.g., cached) by the MDK 12, 14, 16, then the MDK 12, 14, 16 can provide the content without request from the server 28, 30, 140. Otherwise, the selection is transferred to the server 28, 30, 140.

At stages 330, 332, the local multimedia server 28, 30, 140 requests the remote server 32, 34, 170 for a video download in accordance with the subscriber's selection. The content server 32, 34, 170 accesses, retrieves, and provides the selected content to the MDK server 28, 30, 140.

At stages 334, 336, the multimedia server 28, 30, 140 sends an acknowledge message to the mobile user acknowledging the request and availability of the desired content, and instructing the user's device 52, 54, 56, 58, 60 to begin downloading the data. At stage 338, the user's device 52, 54, 56, 58, 60 downloads the content. The content can be provided by the MDK 12, 14, 16 in real time or near-real time, e.g., less than about 10 minutes.

Figure 4:
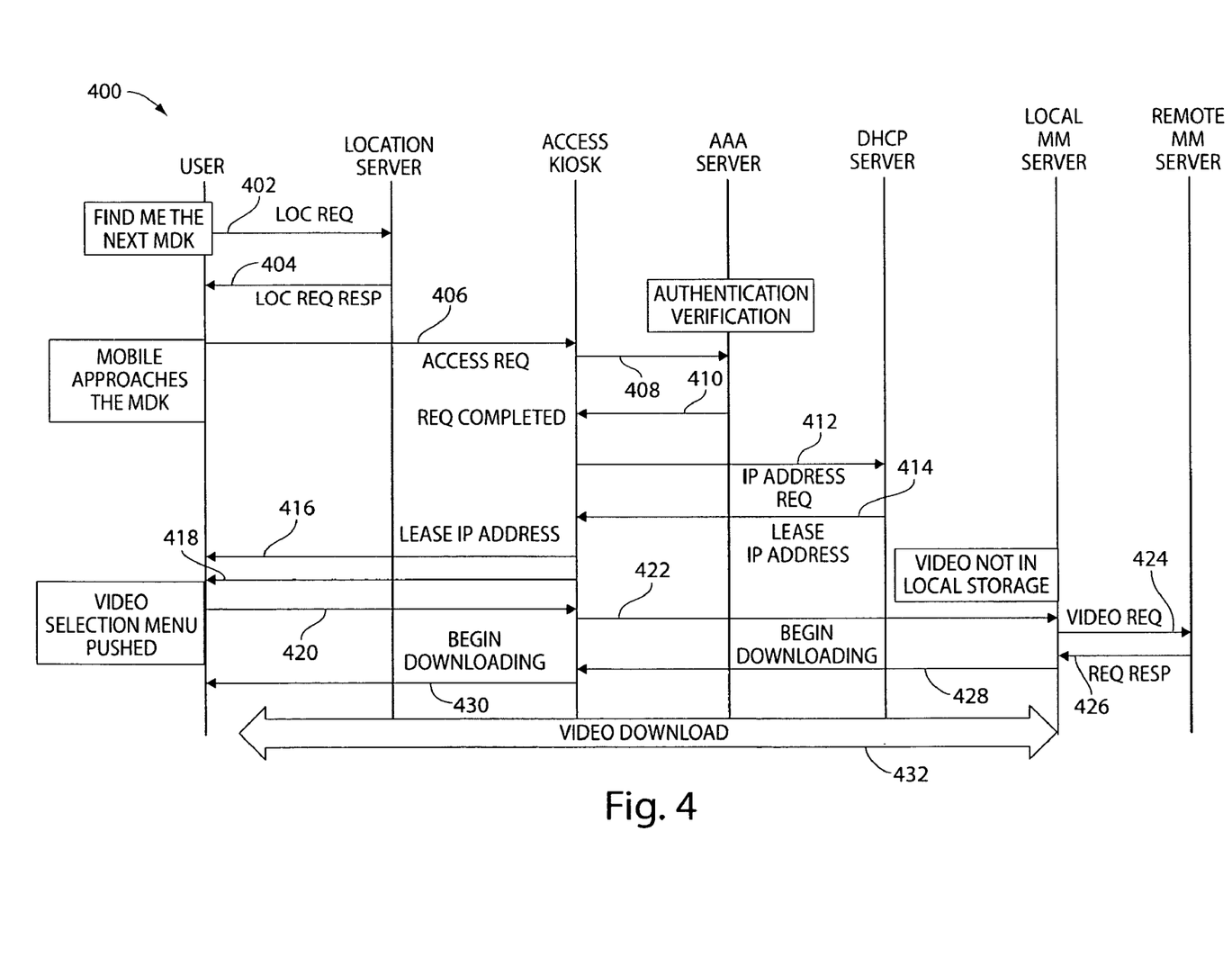
FIG. 4 is a flow diagram of a process of downloading multimedia content to an ad-hoc user using the system shown in FIG. 1.

In operation, referring to FIG. 4, with further reference to FIGS. 1-2, a process 400 for multimedia content, here video, downloading to an ad-hoc user using the system 10 includes the stages shown. The process 400, however, is exemplary only and not limiting. The process 400 can be altered, e.g., by having stages added, removed, or rearranged.

At stage 402, the user requests for location information for the nearest/most appropriate Multimedia Distribution Kiosk 12, 14, 16. If the user is using the phone 62, then the request is processed through the PSTN 24.

At stage 404, the location server 192 and location service 156 determine the nearest/most appropriate MDK 12, 14, 16. This determination may yield an MDK 12, 14, 16 that is not the nearest, e.g., if a further MDK will be nearer when the user desires to stop. The user is sent an indication of the location of the nearest/best MDK 12, 14, 16.

At stage 406, the mobile user approaches the MDK and requests the wireless access point MDK 12, 14, 16 to access the local network.

At stage 408, in response to receiving the access request, the MDK 12, 14, 16 authenticates and authorizes the user through the AAA server 28, 30. The AAA server 28, 30 completes and acknowledges the authentication at stage 410.

At stages 412, 414, 416, a new IP address is leased. At stage 412, the MDK 12, 14, 16 requests the DHCP server 28, 30 for a new IP address. The DHCP server 28, 30 leases an IP address to the mobile user through the MDK 12, 14, 16 at stages 414, 416.

At stage 418, a video selection menu is pushed from the network to the mobile user. This menu may, e.g., present recently released titles first, with one or more options to view available selections that were released further in the past.

At stages 420, 422, the user makes a selection, and requests the local multimedia server for content download. The request is entered through the MDK 12, 14, 16, which conveys the request to the local MDK server 28, 30, 140.

At stages 424, 426, the local multimedia server 28, 30, 140 requests the remote server 32, 34, 170 for a video file download in accordance with the user's selection. The content server 32, 34, 170 accesses, retrieves, and provides the selected content to the MDK server 28, 30, 140.

At stages 428, 430, the multimedia server 28, 30, 140 sends an acknowledge message to the mobile user acknowledging the request and availability of the desired content, and instructing the user's device 52, 54, 56, 58, 60 to begin downloading the data. At stage 432, the user's device 52, 54, 56, 58, 60 downloads the content.

A user may also access content at an MDK 12, 14, 16 from the MDK 12, 14, 16 itself. At an MDK station 12, 14, 16, the user can select a movie via the MDK 12, 14, 16 that presents a GUI interface. The GUI interface allows the selection of contents cached by the MDK 12, 14, 16, with cached contents being provided very quickly to the user. Alternatively, the user can select other content via the connection between the MDK 12, 14, 16 and the MDK server 28, 30, 140. Selected contents can be copied to a CD or DVD via the CD/DVD reader/writer 128. The user may be required to pay before or after writing of the CD or DVD. The user can plug in the CD or DVD to an appropriate device to play back the content at the user's leisure.

Figure 5:
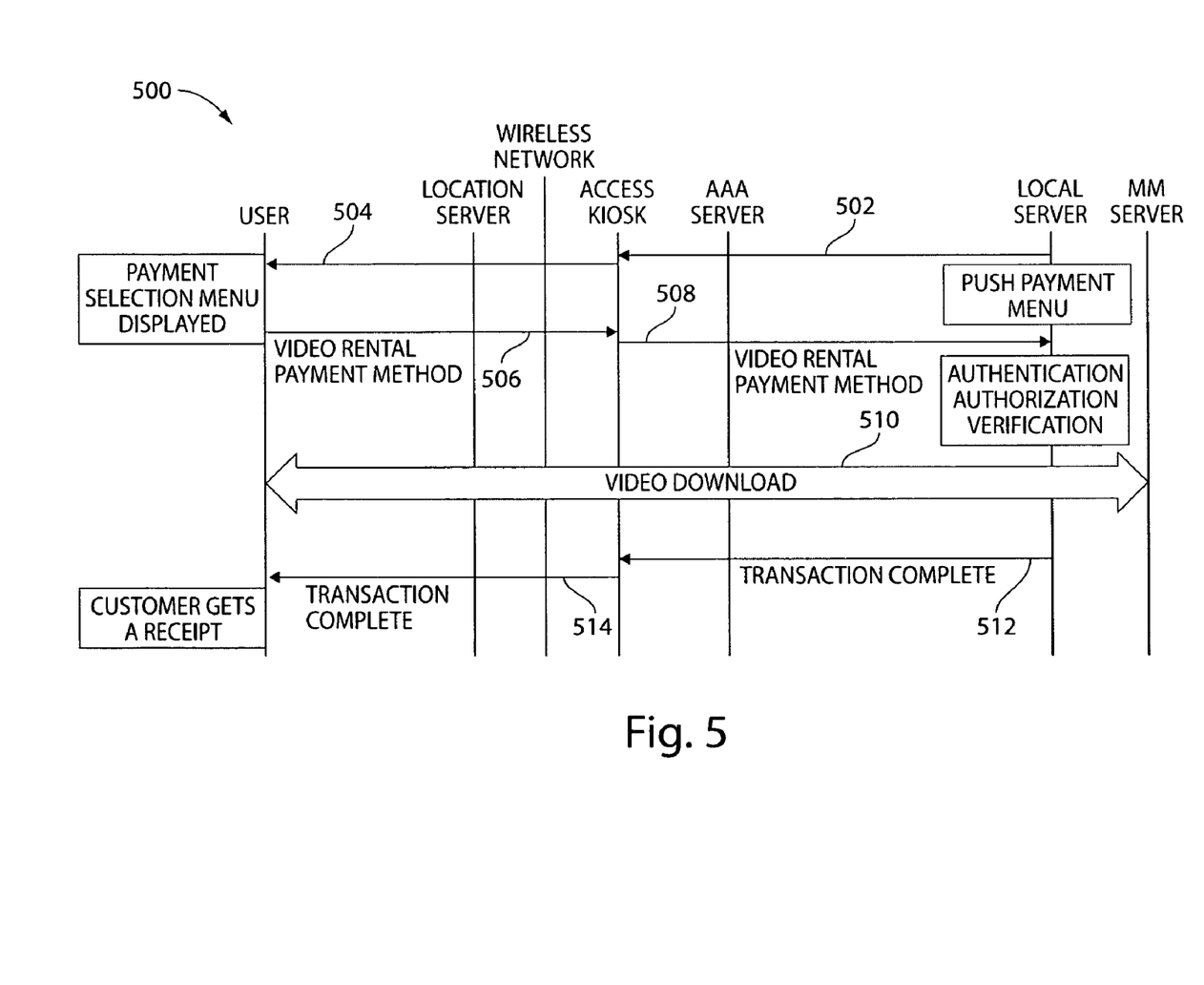
FIG. 5 is a flow diagram of a process of paying for multimedia content using the system shown in FIG. 1.

In operation, referring to FIG. 5, with further reference to FIGS. 1-2, a process 500 for paying for multimedia content at the MDK 12, 14, 16 includes the stages shown. The process 500, however, is exemplary only and not limiting. The process 500 can be altered, e.g., by having stages added, removed, or rearranged.

At stages 502, 504, a payment selection menu is pushed to the user by the MDK server 28, 30, 140. The payment menu can provide preferences, e.g., method of payment, for a subscriber from the subscriber's profile. For example, for an MDK 12, 14, 16 at a gas station (e.g., incorporated into a gas pump), the user may have options to pay with a gas bill, to pay by cash, to pay by credit or debit card, or for a registered user, to make monthly or other time-based installment payments.

At stages 506, 508, the user selects a payment plan and a verification is performed. A subscriber can select a prompted option or, similar to an ad-hoc user, enter a payment option from scratch. The payment plan entered is conveyed to the local server 28, 30, 140, that verifies and authenticates the entered payment plan.

At stages 510, 512, 514, multimedia is downloaded and download acknowledged. At stage 510, the user downloads the user's selection upon arrival at, or at least within the range of, the MDK 12, 14, 16. At stages 512, 514, the local server 28, 30, 140 indicates completion of the download to the MDK 12, 14, 16, that provides a receipt to the user. Downloaded content can be played, viewed, or otherwise used by the user.

Content may be permanent or temporary. For example, a burned CD or DVD may be used by the user for an unlimited time. Alternatively, content may be time limited such that the content is rented, not bought. Even if temporary, the content may be transferable such that, for example, if a user arrives at a destination before completing use of the content (e.g., viewing a movie), the content can be transferred to a player at the destination. A synchronization service may be provided with a home gateway, or other gateway at the destination, that can communicate with the user's device 52, 54, 56, 58, 60 to recognize where the user's use ended (e.g., a "bookmark"). A transfer service will transfer the content to a destination device for continued use by the user. The user may continue to use the content. A time stamp may be used to help ensure expiration of the content and to protect against copyright violation.

Figure 6:
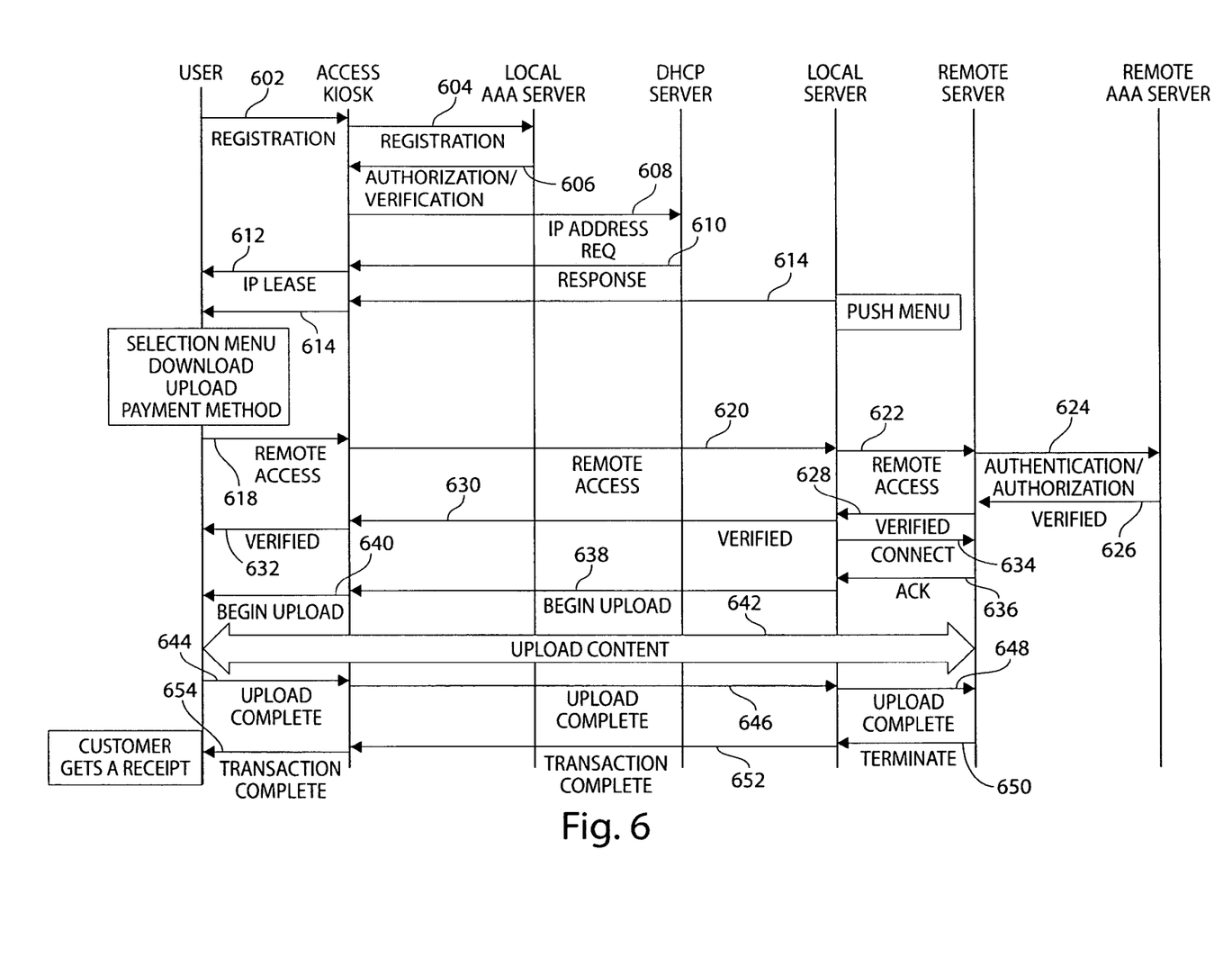
FIG. 6 is a flow diagram of a process of uploading multimedia content from a user to a remove server using the system shown in FIG. 1.

In operation, referring to FIG. 6, with further reference to FIGS. 1-2, a process 600 for uploading multimedia content from the user's device 52, 54, 56, 58, 60 throught the MDK 12, 14, 16 includes the stages shown. The process 500, however, is exemplary only and not limiting. The process 500 can be altered, e.g., by having stages added, removed, or rearranged.

At stages 602, 604, 606, the user registers and is authorized. At stage 602, the user approaches the MDK 12, 14, 16 and the MDK 12, 14, 16 initiates registering the user. The MDK 12, 14, 16 issues a registration request at stage 604 to the local AAA server 28, 30 to authenticate and authorize the user. The server 28, 30 processes the request to register/authorized the user. At stage 606, the AAA server 28, 30 responds to the MDK 12, 14, 16 with appropriate authorization/registration verification.

At stage 608, 610, 612, an IP address is requested, allotted, and assigned. At stage 608, the access kiosk 12, 14, 16 sends an inquiry to the DHCP server 28, 30 for a new IP address. At stage 610, the DHCP server 28, 30 responds with the new IP address leased for the duration of the session. The access kiosk assigns, at stage 612, the new IP address to the user.

At stages 614, 616, a selection menu is pushed to the user. At stage 614, the local server 32, 34 pushes a menu to the kiosk 12, 14, 16 for selecting services. At stage 616, the kiosk 12, 14, 16 pushes the menu to the user. The menu includes prompts for the user to select services. The menu includes upload, download, and method of payment prompts.

At stages 618, 620, 622, 624, 626, 628, 630, 632, the user requests to upload information, is authorized to do so, and receives acknowledgement of the authorization. At stages 618, 620, 622, a request to the kiosk 12, 14, 16 for uploading information from the local server 28, 30, 140 to a remote server 32, 34, is sent from the user, and relayed by the kiosk 12, 14, 16 to the local server 28, 30 and by the local server 28, 30, 140 to the remote server 32, 34. At stages 624, 626, 628, 630, 632, the remote server 28, 30 queries the remote AAA server 28, 30 for authorization and authentication, verification of which is transmitted through the remote server 32, 34, the local server 28, 30, and the kiosk 12, 14, 16 to the user.

At stages 634, 636, 638, 640, 642, a connection is established and the user is instructed to begin uploading. At stage 634, the local server 28, 30, 140 initiates establishment of a connection with the remote server 32, 34. At stage 636, the remote server 32, 34 acknowledges completion of the connection to the local server 28, 30, 140. At stages 638, 640, the local server 28, 30, 140 sends a message through the access kiosk 12, 14, 16 to the user to begin uploading content. At stage 642, the user uploads desired content to the remote server 32, 34.

At stages 644, 646, 648, 650, 652, 654, the user indicates completion of uploading and the transaction completes. At stages 644, 646, 648, the user ends the uploading and sends a message, indicating the end of the upload, to the remote server 32, 34 through the kiosk 12, 14, 16 and the local server 28, 30, 140. At stage 650, the remote server 32, 34 responds to the upload complete message from the user by sending a message to the local server 28, 32, 140 that the session is complete. At stages 652, 654, the local server 28, 30, 140 pushes a transaction receipt to the user through the kiosk 12, 14, 16.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Also, while wireless downloads were shown in FIGS. 3 and 4, physical items such as CDs or DVDs could be burned and picked up by a user at an MDK. Further, the use of the term ID or identity or the like, may relate to information that is not necessarily unique to an individual. For example, a name is not necessarily unique. Additionally, a user's ID could be the user's gender, age, etc., i.e., characteristics to help reduce list of options to provide/suggest, without needing to know exactly who the user is.

What is claimed is:

1. A multimedia distribution kiosk comprising:
a first communication interface configured to receive, from a remote wireless user, a multimedia request at a first speed;
a second communication interface configured to communicate with a multimedia content server at a second speed that is faster than the first speed;
a presence detection module configured to determine whether the remote wireless user is a subscriber or a non-subscriber;
a usage statistics module configured to store usage statistics for both subscribers and non-subscribers;
a cache memory; and
a processor coupled to the first and second communication interfaces, the presence detection module, the usage statistics module, and the cache memory and configured to detect the presence of the wireless user, to classify the remote wireless user as a subscriber or a non-subscriber, to receive an indication of the multimedia request from the first communication interface, the processor being configured such that if the multimedia request is a request to download multimedia content, then the processor will communicate information relating to the indicator of the multimedia request to the multimedia content server through the second communication interface in response to receiving the request, obtain the requested multimedia content through the second communication interface, store the requested multimedia content in the cache memory, provide the requested multimedia content to the wireless user as desired, the processor further configured such that if the multimedia request is a request to upload multimedia content, then the processor will receive a multimedia upload information from the wireless user through the first communication interface, connect to a multimedia content receiver, and transfer the multimedia upload information to the multimedia content receiver through the second communication interface.

2. The kiosk of claim 1 wherein the processor is configured to provide the multimedia content to the user from the multimedia content server in real time or near-real time.

3. The kiosk of claim 1 wherein the processor is configured to provide the multimedia content through a user interface, the user interface including at least one of a third communication interface, and a digital storage device configured to store digital data on a tangible medium.

4. The kiosk of claim 3 wherein the user interface is the digital storage device and is configured to write digital data to at least one of a compact disc, a digital video disc, and a digital audio tape.

5. The kiosk of claim 1 wherein the first interface is configured to receive the remote multimedia request for multimedia content through at least one of a wireless connection and a packet-switched wide-area network communication path.

6. The kiosk of claim 5 wherein the first interface is configured to communicate wirelessly according to at least one of the Bluetooth (IEEE 802.11) protocol, the HiperLAN (IEEE 802.11a) protocol, the U-NII protocol, the IEEE 802.11a, and the IEEE 802.11b protocol.

7. The kiosk of claim 1 wherein the processor is configured to use user information from the first communication interface to provide suggestions for multimedia associated with the user if the indicator of the multimedia request is a request to download multimedia content.

8. The kiosk of claim 7 wherein the processor is configured to obtain the suggestions from the multimedia content server.

9. The kiosk of claim 7 wherein the first communication interface is configured to provide as the user information at least one of information derived by the first communication interface from handshaking for a communication between the first communication interface and the user, information associated with a transmitting device used by the user supplied to the first communication interface from the transmitting device, and information supplied to the first communication interface by the user.

10. A method of processing multimedia data, the method comprising:
detecting the presence of at least one wireless device;
determining whether a user associated with the wireless device is a subscriber or a non-subscriber;
providing remote access, by the at least one wireless device associated with the user, to a first multimedia distribution unit: receiving a multimedia option from the user;
storing the multimedia option and a subscriber status in a usage statistics module;
if the multimedia option is a request to download multimedia content, then:
communicating with the at least one wireless device remotely at a first rate to provide to the user a list indicative of multimedia content, and to receive a selection by the user of desired multimedia content;
communicating inlbrmation related to the selection to the multimedia server in response to receiving the selection;
communicating with the multimedia server to download the desired multimedia content at a second rate to a second multimedia distribution unit, wherein the second rate is faster than the first rate;
caching the downloaded desired multimedia content in the second multimedia distribution unit;
providing the downloaded desired multimedia content from the second multimedia distribution unit;
if the multimedia option is a request to upload multimedia content, then:
receiving a multimedia upload information from the wireless device;
connecting to a multimedia content receiver; and
transferring the multimedia upload information to the multimedia content receiver from the user device.

11. The method of claim 10 further comprising:
obtaining user information to identify the user;
using the user information to obtain recommendations of multimedia data likely to be desired by the user; and
caching the recommendations;
wherein the communicating with the user includes providing the recommendations to the user.

12. The method of claim 11 wherein the downloaded content is provided by at least one of wirelessly communicating with a user device associated with the user, communicating through a physical connection with the user device, and storing the downloaded data on a storage medium and providing the medium to the user.

13. The method of claim 12 wherein the downloaded content is provided wirelessly by communicating with the user device using a short-range wireless protocol.

14. The method of claim 13 wherein short-range wireless protocol is at least one of the Bluetooth (IEEE 802.11)

protocol, the HiperLAN (IEEE 802.11a) protocol, the U-NII protocol, the IEEE 802.11a, and the WLAN (IEEE 802.11b) protocol.

15. The method of claim 12 wherein the downloaded content is provided by storing the downloaded data on a storage medium, and wherein the medium is one of a cassette tape, a compact disc, a digital video disc, a digital audio tape, and a memory chip.

16. The method of claim 10 wherein the first and second multimedia distribution units are separate multimedia distribution units.

17. The method of claim 10 wherein the communicating with the at least one wireless device includes using a short-range wireless protocol.

18. The method of claim 17 wherein short-range wireless protocol is at least one of the Bluetooth (IEEE 802.11) protocol, the HiperLAN (IEEE 802.11a) protocol, the U-NII protocol, the IEEE 802.11a, and the WLAN (IEEE 802.11b) protocol.

* * * * *

UNITED STATES PATENT AND TRADEMARK OFFICE
CERTIFICATE OF CORRECTION

PATENT NO.         : 7,302,465 B2
APPLICATION NO. : 10/057204
DATED                  : November 27, 2007
INVENTOR(S)       : Ayres et al.

It is certified that error appears in the above-identified patent and that said Letters Patent is hereby corrected as shown below:

Column 16, Claim 10, Lines 20 and 21:

"distribution unit: receiving a multimedia option from the user;"

should read:

--distribution unit;

receiving a multimedia option from the user;--

Column 16, Claim 10, Line 30:

"communicating inlbrmation related to the selection to" should read

--communicating information related to the selection to--

Signed and Sealed this

Twenty Second Day of April, 2008

JON W. DUDAS
*Director of the United States Patent and Trademark Office*